W. F. THACHER.
STOP-VALVE.
No. 185,987.  Patented Jan. 2, 1877.
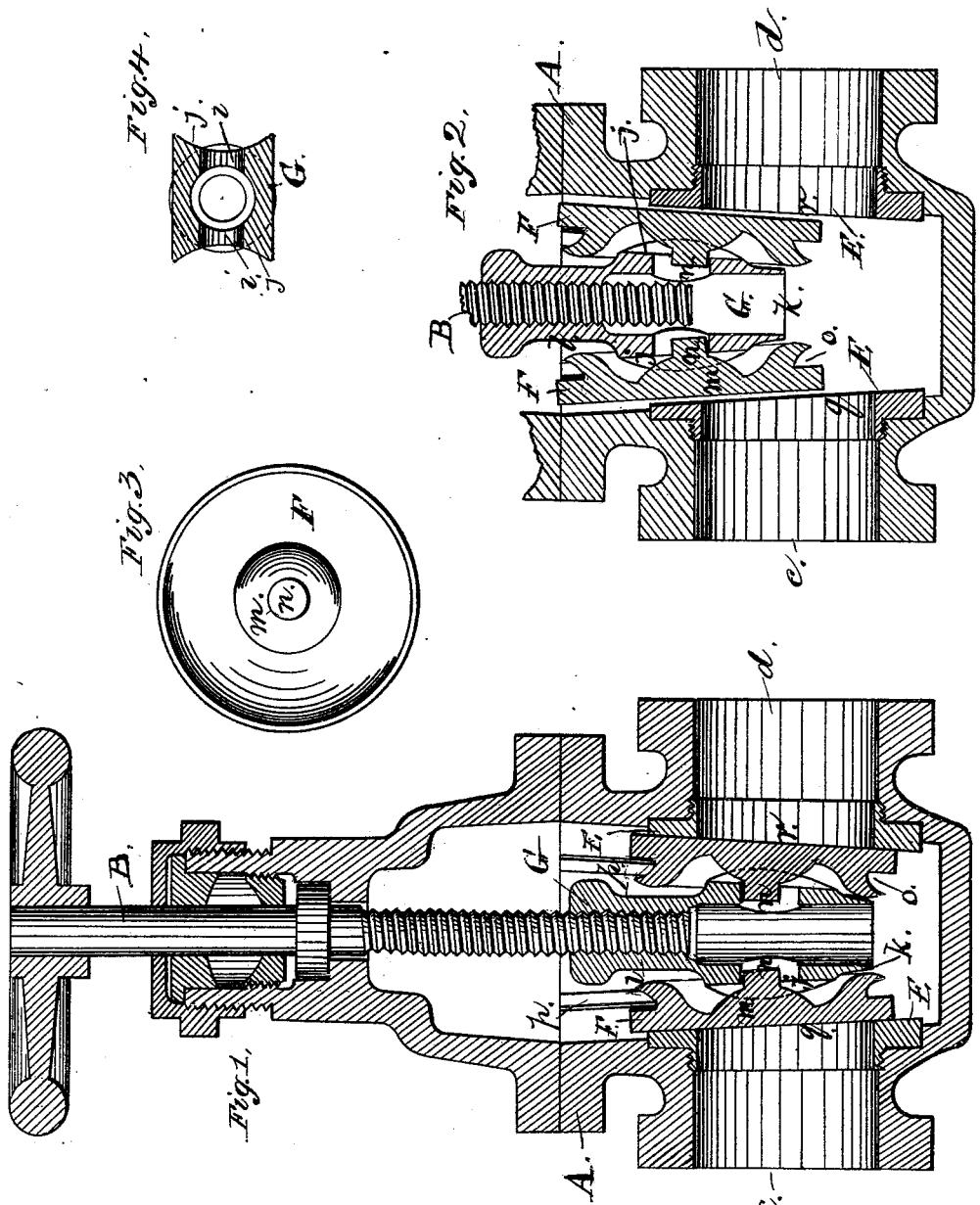
Witnesses:
W. R. Edeler.
Pennington Halsted.
Inventor.
William F. Thacher,
by John J. Halsted
Atty.

UNITED STATES PATENT OFFICE.

WILLIAM F. THACHER, OF FLORENCE, NEW JERSEY.

IMPROVEMENT IN STOP-VALVES.

Specification forming part of Letters Patent No. 185,987, dated January 2, 1877; application filed June 27, 1876.

*To all whom it may concern:*

Be it known that I, WILLIAM F. THACHER, of Florence, in the county of Burlington and State of New Jersey, have invented certain new and useful Improvements in Stop-Valves; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My improvements relate to, and consist in, a special construction of the spreader or device by which the valves or gates are operated and spread apart to close upon their seats; to a special construction and application of the valves or gates, whereby they are not only free to rock in all desirable directions during the acts of seating and unseating them, but also are automatically spread apart, and automatically caused to approach each other at the proper stages, and also have a tendency, when lifted, to turn upon their centers or journals.

A represents the shell or case; B, the stem; c d, the inlet and outlet ports for the water or other fluid—gas or steam, as the case may be; E E, the valve-seats; F F, the valves or gates; G, the spreader attached to the stem.

Spreaders have heretofore, in some instances, been made with two opposite projections or bosses, adapted to lodge in corresponding cavities or openings in the gates. Among the practical disadvantages resulting from this mode of construction the most serious one is, that when the stem is raised to lift the gates the latter become suspended or hung upon the uppermost side of such projection or boss, and, consequently, the center of gravity of the gates is below their point of suspension; and when the lifting begins and continues, the upper parts of the faces of the gates are caused, by reason of the ball or swell upon the spreader, to bear against the sides of the case, instead of being relieved therefrom, the upper side of the ball or swell acting as a wedge, to force apart their gates at their top, and, hence, to bind against the shell or case when they ought to be free. I obviate these objections, and secure positive valuable advantages, by making the spreader as follows: At the two opposite sides I make an opening or hole, *i*, Fig. 4, somewhat of an elliptic shape, its longer diameter being lengthwise of the spreader, and these holes open into inclines or concaves *j j*, the faces of these inclines (which may be either flat or curved in cross-section) having each a slight downward inclination, so that they are nearer together at their lowest parts, and, projecting beyond these lower parts, the spreader has a terminal tip, *k*, whose opposite faces are, preferably, slightly inclined. The upper part *l* of the spreader is screw-threaded, as usual, to receive the screw-thread of the stem.

To adapt the valve disks or gates F to this construction of spreader, and each to the other, to attain the objects sought, I make these gates as follows: At the center of the inside face I make a circular swell, *m*, which may be described as the segment of a sphere of any desired degree of swell, not exceeding a hemisphere, and from the center of this swell projects a journal or nipple, *n*, cylindrical in form, and adapted to lodge loosely in the hole *i* in the spreader, and, when so lodged, the swell *m* lies in its corresponding concave *j* of the spreader, the inclinations of these concaves permitting the two gates, when hung upon the spreader, to incline toward each other. Each gate is also provided with a peripheral groove, *o*, to receive the steadying or guide ribs *p* within the box or case.

The operation is as follows: When turning the stem B to lift the gates, (assuming the latter to be at the lowest points, and the inlet and outlet ports *q r* closed,) at the commencement of the turning of the screw-stem, (which should be so housed, by a flange, collar, or otherwise, in the cap or stuffing-box of the case as not to advance or recede upon being turned,) the spreader first rises, and, by means of its inclines, allows the gates to be relieved of the wedging and lateral pressure which the inclines have been imparting to them, thus releasing the gates from their seats, and leaving them free to come nearer to each other. Next, the lower end of the elongated slot or holes *i* of the spreaders, as the latter continue to rise, begins to pull upward upon the under side of the journal or nipple *n*, this point becoming the point of suspension, and which is, therefore, below the axis of the gates. The greater weight of each gate being thus above its axis, it will revolve upon its journal at the slightest provocation, its own gravity being assisted by the slightest grit, or dirt, or friction, and this without the need of any positive mechanism for imparting rotary motion to them. The advantages due to such rotary motion will be readily understood by those familiar with stop-valves—such as the self-cleaning of the faces of the valves and valve-seats, the constant change of position of the valve about its center, whereby it is prevented from wearing grooves or ridges either in the valves or seats, when particles of sand or gravel get between them, &c.

The convex swell $m$, by reason of its form, and of the manner in which it is adapted to the sides of the spreader, allows, practically, a universality of motion in any required direction, while still preserving the proper close relation of the same to the spreader. The projection or terminal tip $k$ on the spreader acts as a bearing for the disks or gates when they are lifted from their seats, and prevents their being pushed inward at the lowest point, and, consequently, outward at the top against the valve-case, by the pressure of water, &c.

I claim—

1. The disk valve or plate described, having a central convex projection at its back, and a boss or journal extending from such projection, and adapted to enter an opening in the spreader, for the purposes set forth.

2. A spreader, as described, provided with elongated slots, concaved inclined recesses, and a prolongation or tip at its lower end, as and for the purposes set forth.

WILLIAM F. THACHER.

Witnesses:
 WALTER WOOD,
 CHARLES W. SPARBANK.